UNITED STATES PATENT OFFICE.

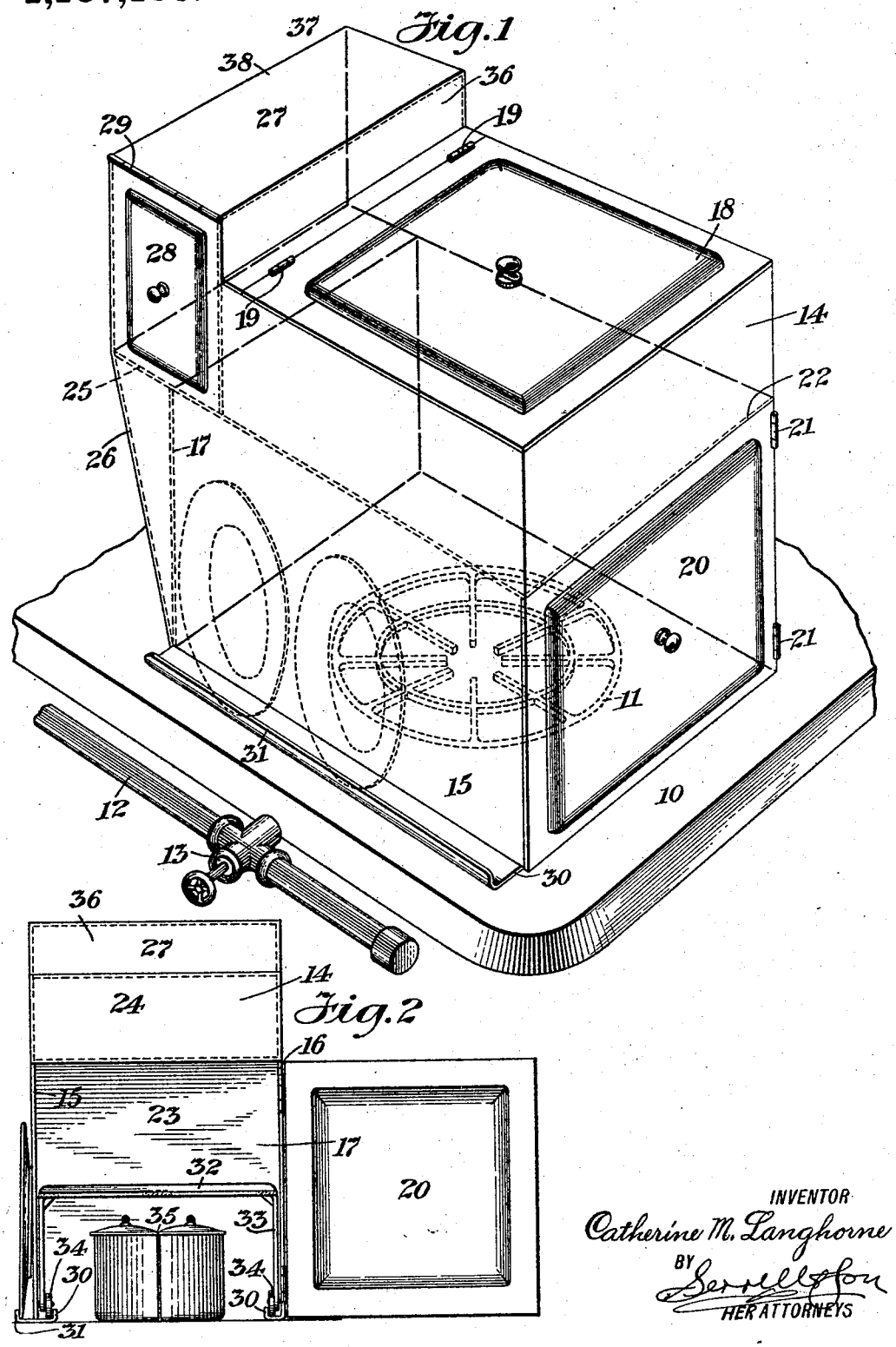

CATHERINE MUNRO LANGHORNE, OF PLAINFIELD, NEW JERSEY.

KITCHEN UTENSIL.

1,187,156.　　　　Specification of Letters Patent.　　Patented June 13, 1916.

Application filed November 22, 1915. Serial No. 62,752.

*To all whom it may concern:*

Be it known that I, CATHERINE MUNRO LANGHORNE, a citizen of the United States, residing at Plainfield, in the county of Union and State of New Jersey, have invented an Improvement in Kitchen Utensils, of which the following is a specification.

My present invention relates to kitchen utensils and particularly to a cooking apparatus.

Heretofore, as is more or less generally known, in summer bungalows, camps and similar places, it is customary in cooking to use a single burner oil or gas stove and with such burners, of course, there is no oven or warming chamber or other features such as are commonly incorporated in gas or oil stoves. As will be appreciated in the use of single oil or gas burners as hereinbefore indicated not only difficulty but inconvenience is often experienced in preparing meals.

The object of my invention, therefore, is the provision of an apparatus to be used in conjunction with the burners of an oil or gas stove and which serves all the purposes of an oven and a warming chamber and is adapted to be kept permanently in place on the stove or when not needed or not in use may be readily removed and stored. In carrying out my invention the apparatus is preferably made of sheet metal in such a form as to comprise an oven, a warming chamber, as well as an auxiliary warming chamber and includes also a grill which may be readily placed within and removed from the oven for use in baking various articles at the same time the oven and burner are being used for other purposes as will be hereinafter more particularly described.

In the drawing, Figure 1, is a perspective view of the apparatus made in accordance with my invention showing the same placed upon the burner of an oil stove, and Fig. 2, is a front elevation of the apparatus showing the oven door open.

Referring to the drawing, 10 indicates the top of an oil stove, the burner of which is indicated at 11.

12 designates the supply pipe by which the fuel is conveyed to the burner, the passage of the fuel being controlled by a valve or cock indicated at 13. The cooking apparatus made in accordance with my invention is preferably made of sheet metal or other similar material so formed as to comprise a front wall 14, side walls 15 and 16, a rear wall 17, and a top wall 18 hinged at 19 to form a door. At the lower portion of the front wall there is also a door 20 which as shown in the drawing may be hinged at one side as indicated at 21 or may be supported on lugs so as to be entirely removable from the structure. The compartment formed by these walls is divided by a partition wall 22 extending parallel to the top and base of the apparatus so as to divide the interior thereof into an oven 23 and a warming chamber 24, access to the oven being had through the door 20, while the warming chamber is immediately above the oven and access thereto is gained through the top member or door 18.

The partition wall 22 as will be seen in Fig. 1 extends an appreciable distance over the rear wall 17 as indicated at 25 and extending between the rear end of the partition wall and the lower edge of the rear wall 17 is inclined wall 26 forming a chamber which is triangular in cross section, and closed at its ends by extensions of the side walls 15 and 16. As will also be seen in Fig. 1, the warming chamber is appreciably shorter than the oven and the rear of the warming chamber is formed by a wall 36 extending upwardly from the partition wall 22 at a point appreciably distant from the rear wall 17 and this wall 36 also extends up an appreciable distance above the top or door 18 so that the upper edge thereof acts as a stop and support for the door 18 when open. A wall 37 parallel to the wall 36 extends upwardly from the rear end of partition wall 22 and these walls together with a top 38 and extensions of the side walls 15 and 16 form an auxiliary heating chamber 27 which at one end is provided with a door 28 hinged as indicated at 29 or otherwise secured in place so as to gain access to the auxiliary heating chamber. This heating chamber as will be seen extends partially over the oven and is also immediately adjacent the main warming chamber 24.

The apparatus along the lower edges of side walls 15 and 16 is provided with feet 30 which extend appreciable distances on both sides of these walls and are flanged as indicated at 31, the parts of the feet extending outwardly forming plate racks and the parts extending inwardly forming tracks for a grid or grill as will be hereinafter explained. I also provide a grid or grill 32 adapted to fit within the oven 23 and mounted upon legs 33 at the end of each of which is a roller 34 adapted to roll in the inwardly extending parts of the feet 30 so that the grid may be readily placed in position in the oven and supported therein and as readily removed therefrom.

In the use of the hereinbefore described apparatus as will now be appreciated the oven may be used for baking and for similar purposes for which ovens are commonly used and the grid at the same time may be employed for baking potatoes, apples or other uses, and the warming chamber for keeping toasts, rolls and other articles warm while the oven is used for other purposes, while the auxiliary warming chamber is particularly adapted to contain a coffee or tea pot in order to keep the coffee or tea hot. As shown in Fig. 2, it is also possible to use a sauce pan 35, of the single or double type placed immediately upon the burner and at the same time to use the grid for baking purposes while simultaneously the warming chamber and auxiliary warming chamber are being used for the purposes herein indicated. It will also be appreciated that the apparatus herein shown and described can be readily placed upon a single burner oil or gas stove and when not in use may be easily removed and stored, it being particularly adapted for cooking in light housekeeping.

I claim as my invention:

1. An article of the class described comprising a sheet metal frame so formed as to contain an oven compartment, a warming chamber above the same, and an auxiliary warming chamber extending over a part of the oven and also adjacent the said warming chamber.

2. An article of the class described comprising side, rear and top sheet metal walls, a partition wall dividing the interior into an oven compartment and a warming chamber above the same, and also an auxiliary warming chamber extending partially over the oven and also adjacent the said warming chamber.

3. An article of the class described comprising side, rear and top sheet metal walls, a partition wall dividing the interior thereof into an oven and a warming chamber above the same, the inside partition wall extending an appreciable distance beyond the said rear wall, an inclined wall extending from the rear end of the partition wall to the lower edge of the rear wall and forming a chamber which is triangular in cross section, a wall extending upwardly from the partition wall an appreciable distance from the rear wall, a wall extending upwardly from the rear of the partition wall, a top for the last aforesaid walls, there being extensions of the side walls inclosing said triangular compartment and forming the ends of an auxiliary heating chamber which lies partially over the oven and adjacent said heating chamber.

4. An article of the class described comprising a sheet metal frame, formed of side, front, rear and top walls to include an oven compartment and a warming chamber above the same, feet extending along the lower edges of the side walls and to an appreciable distance on both sides thereof, those portions of the feet extending outwardly of the side walls being adapted to form plate racks.

5. An article of the class described comprising a sheet metal frame having front, rear, side and top walls to contain an oven compartment and a warming chamber above the same, a grid adapted to fit within said oven, legs secured to the corners of said grid, rollers attached to the ends of the legs, and feet secured to the lower edges of the side members and extending appreciably on both sides of the same, those portions of the feet extending outwardly of the side members being adapted to be used as plate racks while those portions of the feet extending inwardly of the inside members act as tracks upon which said rollers run in placing the grid in the oven and removing the same therefrom.

Signed by me this 16th day of November, 1915.

CATHERINE MUNRO LANGHORNE.

Copies of this patent may be obtained for five cents each, by addressing the "Commissioner of Patents, Washington, D. C."